United States Patent
Lin

(10) Patent No.: US 11,397,316 B2
(45) Date of Patent: Jul. 26, 2022

(54) PROJECTION DEVICE

(71) Applicant: Coretronic Corporation, Hsin-Chu (TW)

(72) Inventor: Shi-Hao Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/210,510

(22) Filed: Mar. 24, 2021

(65) Prior Publication Data
US 2021/0389584 A1     Dec. 16, 2021

(30) Foreign Application Priority Data

Jun. 11, 2020   (CN) .......................... 202010528156.2

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01); *G03B 21/208* (2013.01); *G03B 21/2013* (2013.01); *G03B 21/2066* (2013.01)

(58) Field of Classification Search
None
See application file for complete search history.

(56) References Cited

U.S. PATENT DOCUMENTS

| | | | |
|---|---|---|---|
| 7,993,011 B2 | 8/2011 | Ikeda et al. | |
| 2012/0092626 A1* | 4/2012 | Chang .................. | G03B 21/208 353/38 |
| 2013/0050654 A1* | 2/2013 | Hu ........................ | G03B 21/204 353/31 |
| 2014/0354892 A1* | 12/2014 | Kitano ................... | G03B 21/16 348/744 |
| 2018/0143520 A1* | 5/2018 | Ishijima ............... | G03B 21/147 |
| 2019/0331991 A1 | 10/2019 | Ikeda et al. | |

FOREIGN PATENT DOCUMENTS

| | | |
|---|---|---|
| TW | I330295 | 9/2010 |
| TW | I639035 | 10/2018 |

OTHER PUBLICATIONS

Search report of European Counterpart Application, dated Aug. 25, 2021, pp. 1-9.

\* cited by examiner

*Primary Examiner* — Michelle M Iacoletti
*Assistant Examiner* — Danell L Owens
(74) *Attorney, Agent, or Firm* — JCIPRNET

(57) ABSTRACT

A projection device is provided. An excitation light source of the projection device emits a first light beam incident to a light wavelength conversion wheel along a first direction. The light wavelength conversion wheel outputs the first light beam at a first timing, and converts the first light beam into a second light beam to be outputted at a second timing. The second light beam exits the light wavelength conversion wheel along a second direction. The first and second light beams sequentially penetrate a color filter wheel and a light homogenizing element, so that an illumination system outputs an illumination beam. The illumination beam is incident to a light valve along a third direction to be converted into an image beam. The image beam exits the light valve along a fourth direction. The first to fourth directions are different from each other and are located on a same plane.

14 Claims, 4 Drawing Sheets

PROJECTION DEVICE

CROSS-REFERENCE TO RELATED APPLICATION

This application claims the priority benefit of China application serial no. 202010528156.2, filed on Jun. 11, 2020. The entirety of the above-mentioned patent application is hereby incorporated by reference herein and made a part of this specification.

BACKGROUND

Technical Field

The disclosure relates to an optical device, and in particular, to a projection device.

Description of Related Art

Generally, a laser projection device uses a light source module to generate a light beam. The light beam passes through a color filter wheel to sequentially generate light beams of different colors. After the light beams penetrate a light homogenizing element to shape light homogeneously, an image beam is generated by using a light valve. The image beam is projected through a projection lens group, so that the projection device outputs an image.

For example, after the light source module causes a blue laser light emitted by a blue laser diode array to be collimated through an optical element, the collimated blue laser light is incident to a rotating phosphor wheel. When the blue laser light hits a phosphor region, the blue laser light excites the phosphor to generate a yellow light, and the yellow light is then incident to the light homogenizing element. When the blue laser light is irradiated on a reflection region of the phosphor wheel, the blue laser light is reflected to the light homogenizing element.

The foregoing light beam is incident to the light valve after penetrating the light homogenizing element. The light valve is usually a digital micro-mirror device (DMD). Due to limitation of a flip angle of a movable micro-lens of the digital micro-mirror device, the light beam is usually selected to be incident to the light valve from below or obliquely from below. However, with an optical path structure of incidence below or oblique incidence below, the volume of the projection device cannot be further reduced.

In addition, the phosphor wheel and the color filter wheel in the projection device are disposed perpendicular to each other. However, such a configuration leads to a greater depth of the system volume of the projection device and does not facilitate shortening of a projection distance.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection device, in which an optical path structure facilitates reduction of a volume and shortening of a projection distance.

In order to achieve one or a part or all of the foregoing objectives, or other objectives, a projection device according to an embodiment of the invention includes an illumination system, a light valve, and a projection lens. The illumination system is configured to provide an illumination beam. The light valve is disposed on a transmission path of the illumination beam and is configured to convert the illumination beam into an image beam. The projection lens is disposed on a transmission path of the image beam, and configured to project the image beam out of the projection device. The illumination system includes an excitation light source, a light wavelength conversion wheel, a color filter wheel, and a light homogenizing element. The excitation light source is configured to emit a first light beam. The first light beam is incident to a light wavelength conversion wheel along a first direction. The light wavelength conversion wheel receives the first light beam. At a first timing, the light wavelength conversion wheel outputs the first light beam; at a second timing, the light wavelength conversion wheel converts the first light beam into a second light beam and outputs the second light beam. The second light beam exits from the light wavelength conversion wheel along a second direction. The first light beam and the second light beam sequentially penetrate a color filter wheel and a light homogenizing element, so that an illumination system outputs an illumination beam. The illumination beam includes the first light beam and the second light beam. The illumination beam is incident to a light valve along a third direction, and is converted into an image beam through the light valve. The image beam exits from the light valve along a fourth direction. The first direction, the second direction, the third direction, and the fourth direction are different from each other and located on a same plane.

Based on the foregoing, in the projection device according to an embodiment of the invention, because the first direction, the second direction, the third direction, and the fourth direction in the optical path of the projection device are different from each other and are located on the same plane, a depth of a system volume of the projection device may be effectively reduced, facilitating shorting of a projection distance.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
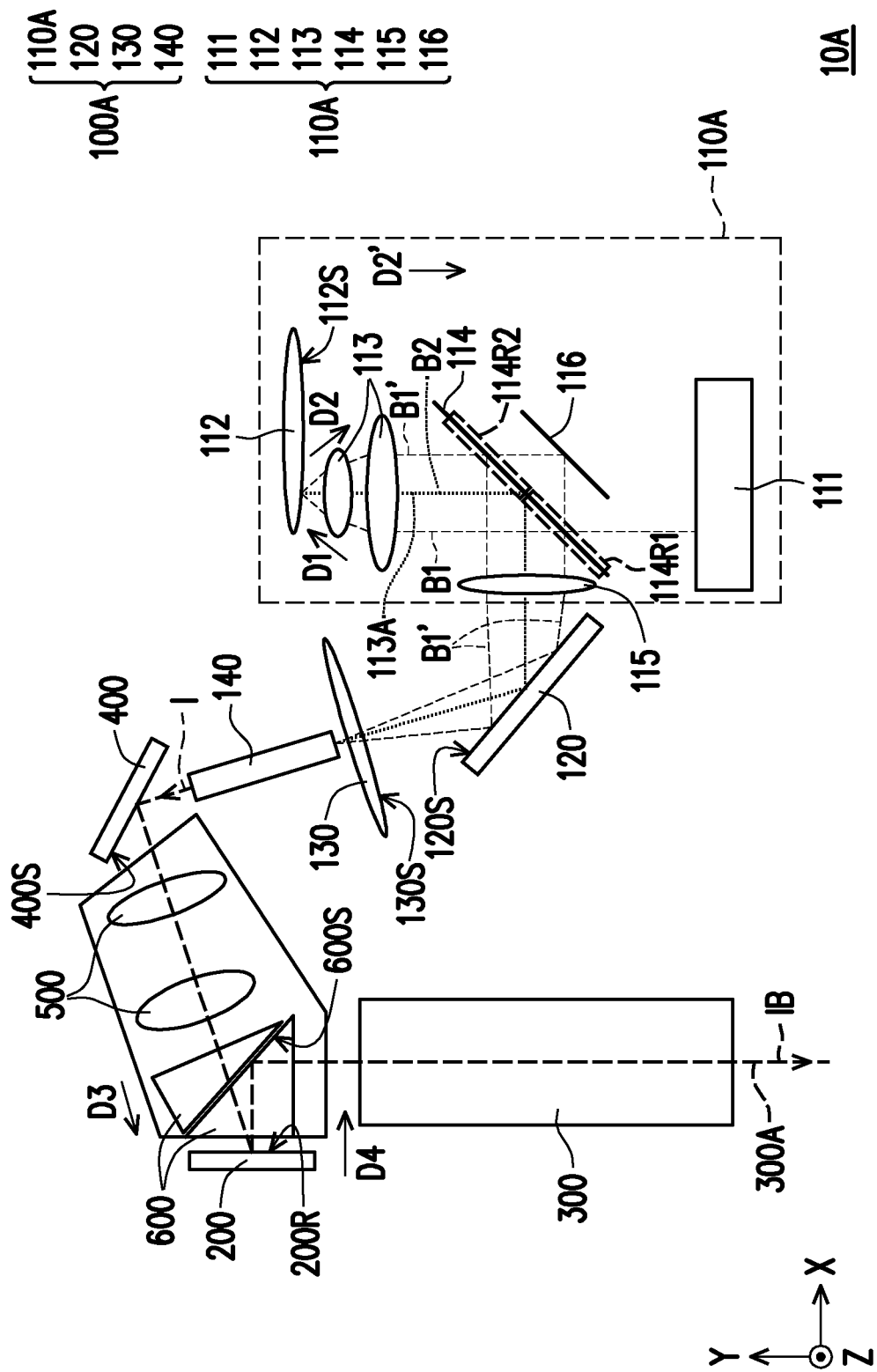
FIG. 1 is a schematic diagram of a projection device according to an embodiment of the invention.

FIG. 1 is a schematic diagram of a projection device according to an embodiment of the invention. Referring to FIG. 1, a projection device 10A according to an embodiment of the invention includes an illumination system 100A, a light valve 200, and a projection lens 300. The illumination system 100A is configured to provide an illumination beam I. The light valve 200 is disposed on a transmission path of the illumination beam I and configured to convert the illumination beam I into an image beam IB. The projection lens 300 is disposed on a transmission path of the image beam IB and configured to project the image beam IB out of the projection device 10A.

In detail, the illumination system 100A of the embodiment includes a light combining module 110A, a color filter wheel 130, and a light homogenizing element 140. The light combining module 110A is configured to output light of different light colors at different timings. The light combining module 110A includes an excitation light source 111, a light wavelength conversion wheel 112, a first lens group 113, an optical path switching element 114, a lens 115, and a reflective element 116. The excitation light source 111 corresponds to a first region 114R1 of the optical path switching element 114.

In the embodiment, the excitation light source 111 is configured to emit a first light beam B1. The excitation light source 111 is, for example, a laser diode (LD), a light emitting diode (LED), or other suitable light sources or a combination thereof, and the invention is not limited thereto. In addition, the first light beam B1 may be blue light, red light, green light, or light of other light colors.

For example, the first light beam B1 is blue light. In the embodiment, the first light beam B1 emitted by the excitation light source 111 first penetrates the first region 114R1 of the optical path switching element 114 and is then incident to the first lens group 113 by deviating from an optical axis 113A of the first lens group 113. The first region 114R1 of the optical path switching element 114 is, for example, a region in which the blue light penetrates and yellow light is reflected. In the embodiment, the light wavelength conversion wheel 112 is a reflective phosphor wheel and includes a phosphor region and a non-phosphor region. The non-phosphor region is, for example, a blue light reflection region. The phosphor region and the non-phosphor region of the light wavelength conversion wheel 112 are both provided with a reflective film layer to reflect the light beam. At a first timing, after the first light beam B1 penetrates the first lens group 113, the first light beam B1 is incident to the non-phosphor region of the light wavelength conversion wheel 112 along a first direction D1, and the light wavelength conversion wheel 112 receives the first light beam B1 and outputs, at the first timing, a first light beam B1'. The first light beam BF exits from the light wavelength conversion wheel 112 along a second direction D2, and the first light beam B1' is a reflected light beam of the first light beam B1. In addition, after the first light beam BF reflected by the non-phosphor region of the light wavelength conversion wheel 112 penetrates the first lens group 113 by deviating from the optical axis 113A of the first lens group 113, the first light beam B1' is incident to a second region 114R2 of the optical path switching element 114. The second region 114R2 of the optical path switching element 114 is, for example, a region in which the blue light is semi-transmissive and semi-reflective and the yellow light is reflected. Therefore, one part of the first light beam B1' is sequentially reflected by the second region 114R2 of the optical path switching element 114, penetrates the lens 115 and a blue region of the color filter wheel 130, and is then incident to the light homogenizing element 140. The other part of the first light beam B1' sequentially penetrates the second region 114R2 of the optical path switching element 114, is reflected by the reflective element 116, penetrates the first region 114R1 of the optical path switching element 114, penetrates the lens 115 and the blue light region of the color filter wheel 130, and is then incident to the light homogenizing element 140.

At a second timing of the embodiment, after the first light beam B1 penetrates the first lens group 113, the first light beam B1 is incident to the phosphor region of the light wavelength conversion wheel 112 along the first direction D1, and the phosphor region of the light wavelength conversion wheel 112 converts the first light beam B1 into the second light beam B2 and outputs the second light beam B2 along a second direction D2'. The second light beam B2 is, for example, the yellow light. In other words, the phosphor region of the light wavelength conversion wheel 112 may convert the blue light into the yellow light and reflect the yellow light to exit from the light wavelength conversion wheel 112. The second direction D2' may overlap an optical axis 113A of the first lens group 113. In addition, the second light beam B2 sequentially penetrates the first lens group 113, is reflected by the optical path switching element 114, penetrates the lens 115 and the yellow light region of the color filter wheel 130, and is then incident to the light homogenizing element 140.

In the embodiment, after the first light beam BF and the second light beam B2 penetrate the light homogenizing element 140, the illumination system 100A outputs the illumination beam I. In other words, the illumination beam I includes the first beam B1' and the second beam B2.

In the embodiment, the light homogenizing element 140 homogenizes the penetrated first light beam B1' and the penetrated second light beam B2. The light homogenizing element 140 is, for example, an integration rod, a lens array, or other optical elements having a light homogenizing effect, but the invention is not limited thereto.

In the embodiment, the illumination beam I is incident to the light valve 200 along a third direction D3, and the illumination beam I is converted into the image beam IB through the light valve 200. The image beam IB exits from the light valve 200 along a fourth direction D4. The first direction D1, the second direction D2', the third direction D3, and the fourth direction D4 are different from each other and are located on a same plane (e.g., an XY plane of FIG. 1).

Referring to FIG. 1, in the embodiment, the projection device 10A further includes a first reflector 120. The first reflector 120 is disposed between the light wavelength conversion wheel 112 and the color filter wheel 130 on transmission paths of the first light beam B1' and the second light beam B2, and is configured to reflect the first light beam B1' and the second light beam B2 from the light wavelength conversion wheel 112 to the color filter wheel 130. In FIG. 1, the first reflector 120 is disposed between the lens 115 and the color filter wheel 130 on transmission paths of the first light beam B1' and the second light beam B2.

In the embodiment, the projection device 10A further includes a second reflector 400. The second reflector 400 is disposed between the light homogenizing element 140 and the light valve 200 on a transmission path of the illumination beam I, and is configured to reflect the illumination beam I from the light homogenizing element 140, so that the illumination beam I from the light homogenizing element 140 is incident to the light valve 200 along the third direction D3.

In an embodiment, the first reflector 120 or the second reflector 400 may be a plane mirror, a convex mirror, a concave mirror, or a prism. In another embodiment, the first reflector 120 or the second reflector 400 may be a completely reflective mirror or a white reflective sheet. When the first reflector 120 or the second reflector 400 is the completely reflective mirror, light energy utilization efficiency of the projection device 10A is good. When the first reflector 120 or the second reflector 400 is the white reflective sheet, because the white reflective sheet is a reflective sheet with a diffusion effect, homogeneity of the light beam generated by the projection device 10A is better. In a projection device 10A according to an embodiment of the invention, because the projection device 10A includes the first reflector 120 and/or the second reflector 400, the projection device 10A may perform folding of an optical path and changes a beam transmission direction by using the first reflector 120 or the second reflector 400 at a part in a long optical path, so that a volume of the projection device 10A may be further reduced.

In the embodiment, a reflective surface 120S of the first reflector 120 and a reflective surface 400S of the second reflector 400 are perpendicular to the foregoing plane (for example, the XY plane of FIG. 1).

In an embodiment, the first reflector 120 or the second reflector 400 is a movable member. For example, a user of the projection device 10A may adjust an angle or a position of the first reflector 120 or the second reflector 400 to cause an image generated by the projection device 10A to be better.

In another embodiment, the first reflector 120 or the second reflector 400 may be a fixed member, so that the image generated by the projection device 10A is not obviously affected by an external factor such as vibration. Therefore, quality of the image generated by the projection device 10A is stable.

Referring to FIG. 1, in the embodiment, the projection device 10A further includes a second lens group 500 and a prism group 600. The second lens group 500 and the prism group 600 are disposed between the second reflector 400 and the light valve 200 on the transmission path of the illumination beam I. The prism group 600 may be a total internal reflection prism (TIR prism) composed of two prisms. The illumination beam I reflected by the second reflector 400 first penetrates the second lens group 500 and then penetrates an inner inclined surface 600S of the prism group 600 to be incident to the light valve 200 along the third direction D3. The illumination beam I is converted into the image beam IB through the light valve 200, and the image beam IB exits from the light valve 200 along the fourth direction D4. Next, the image beam IB is transmitted to the prism group 600, and is totally reflected to the projection lens 300 by the inner inclined surface 600S of the prism group 600.

Figure 2:
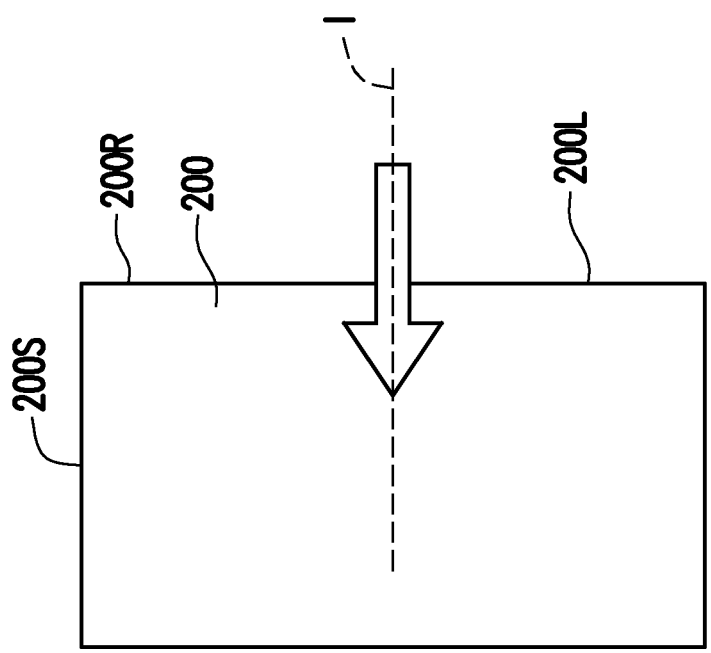
FIG. 2 is a schematic diagram of an illumination beam incident to a light valve in a projection device according to an embodiment of the invention.

FIG. 2 is a schematic diagram of an illumination beam is incident to a light valve in a projection device according to an embodiment of the invention. In the embodiment, a light valve 200 is, for example, a spatial light modulator such as a digital micro-mirror device (DMD), a liquid crystal-on-silicon panel (LCOS Panel), or a liquid crystal panel (LCD), etc. In order to improve an imaging effect, the light valve 200 is preferably the digital micro-mirror device. For example, the light valve 200 is a digital micro-mirror device, and the light valve 200 has a plurality of movable micro mirrors presenting an array form. The plurality of movable micro mirrors forms an effective imaging region 200R, and the effective imaging region 200R has a long side 200L and a short side 200S.

Referring to both FIG. 1 and FIG. 2, in the embodiment, the long side 200L of the effective imaging region 200R of the light valve 200 is perpendicular to the foregoing plane (for example, the XY plane of FIG. 1), and the short side 200S thereof is parallel to the foregoing plane (for example, the XY plane of FIG. 1). A projection of the illumination beam I on the light valve 200 is parallel to the short side 200S of the effective imaging region 200R of the light valve 200. In a projection device 10A according to an embodiment of the invention, because the long side 200L of the effective imaging region 200R of the light valve 200 is perpendicular to the foregoing plane, and the projection of the illumination beam I onto the light valve 200 is parallel to the short side 200S of the effective imaging region 200R of the light valve 200, the image beam IB converted by the light valve 200 may exit from the light valve 200 along a fourth direction D4 parallel to the foregoing plane, so that a volume of the projection device 10A may be further reduced.

In the embodiment, an optical surface 112S of a light wavelength conversion wheel 112, a light surface 130S of a color filter wheel 130, and the effective imaging region 200R of the light valve 200 are not parallel to each other, the optical surface 112S of the light wavelength conversion wheel 112 and the optical surface 130S of the color filter wheel 130 are not perpendicular to each other, and the optical surface 130S of the color filter wheel 130 and the effective imaging region 200R of the light valve 200 are not perpendicular to each other. Therefore, a depth of a system volume of the projection device 10A may be effectively reduced, facilitating shortening of a projection distance. In other embodiments, the optical surface of the light wavelength conversion wheel, the optical surface of the color filter wheel, and the effective imaging region of the light valve may not be perpendicular to each other and may not be parallel to each other, so that the system volume may be more effectively reduced.

In the embodiment, the optical surface 112S of the light wavelength conversion wheel 112, the optical surface 130S of the color filter wheel 130, and the effective imaging region 200R of the light valve 200 are perpendicular to the foregoing plane (for example, the XY plane of FIG. 1). Therefore, a lateral volume of the projection device 10A may be effectively reduced.

In the embodiment, the projection lens 300 is, for example, a combination including one or more optical lenses with a diopter. The optical lenses include, for example, various combinations of non-planar lenses such as a biconcave lens, a biconvex lens, a concavo-convex lens, a convexo-concave lens, a plano-convex lens, and a plano-concave lens. A form and a type of the projection lens 300 are not limited in the invention.

In the embodiment, an optical axis 300A of the projection lens 300 is parallel to the foregoing plane (for example, the XY plane of FIG. 1). In addition, the projection lens 300 has a movable axis (for example, Z axis). The movable axis is perpendicular to the foregoing plane, and the optical axis 300A of the projection lens 300A may move along the movable axis as required. In the projection device 10A according to an embodiment of the invention, because the projection lens 300 has a movable axis, an image of the projection device 10A may be adjusted according to the projection environment, so that the user has better user experience.

Figure 3:
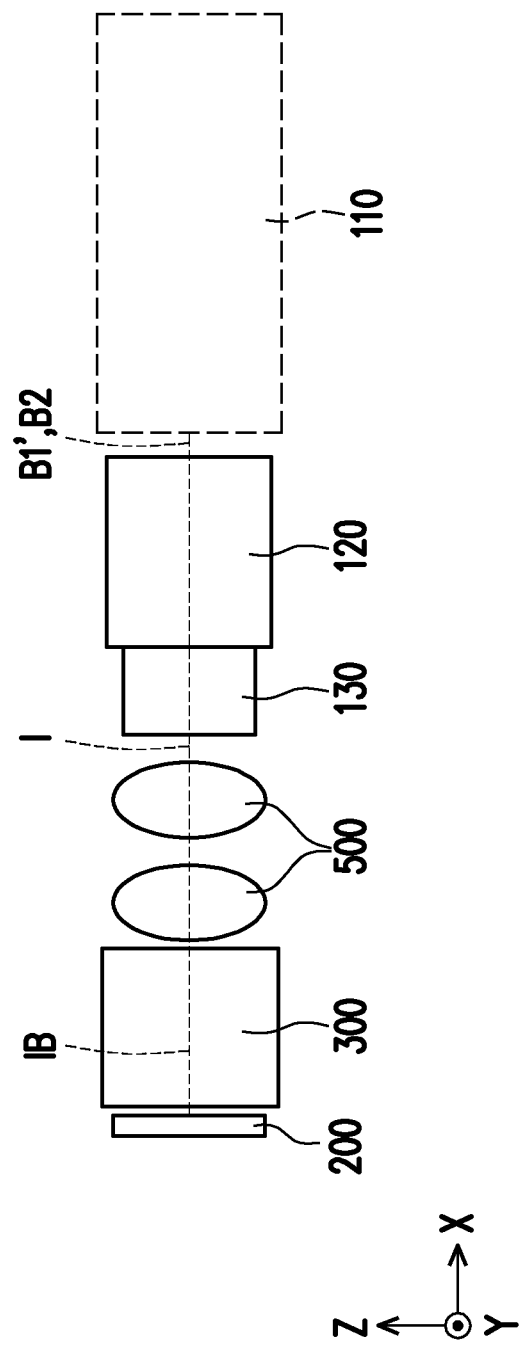
FIG. 3 is a schematic side view of a projection device according to an embodiment of the invention.

FIG. 3 is a schematic side view of a projection device according to an embodiment of the invention. Referring to FIG. 1 and FIG. 3, in a projection device 10A according to an embodiment of the invention, due to a disposing manner of optical elements in the projection device 10A, a first direction D1 in an optical path, a second direction D2' of a second light beam B2, a third direction D3, and a fourth direction D4 are different from each other and are located on a same plane. Therefore, a depth of a system volume of the projection device 10A may be effectively reduced, facilitating shorting of a projection distance.

Figure 4:
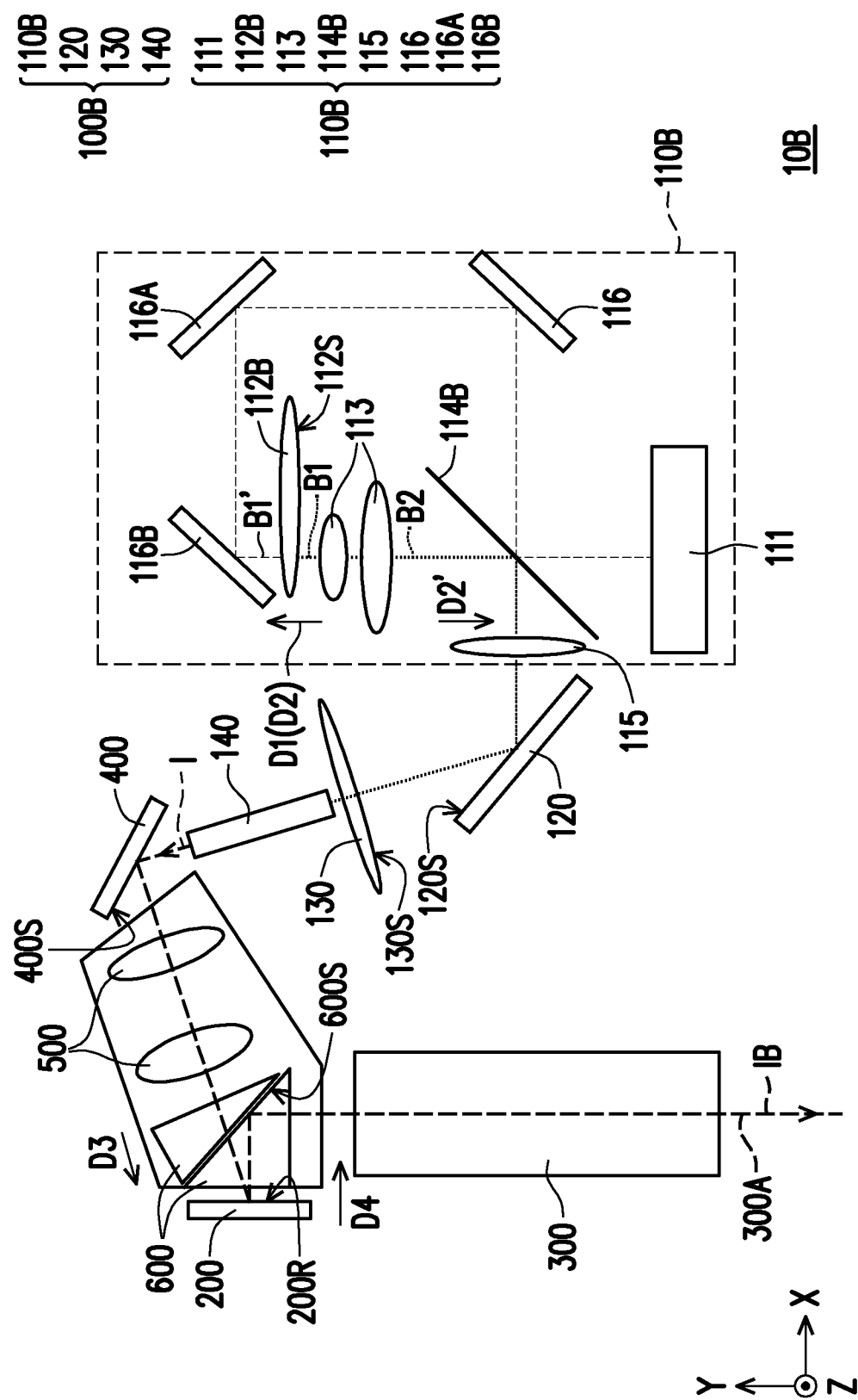
FIG. 4 is a schematic diagram of a projection device according to another embodiment of the invention.

FIG. 4 is a schematic diagram of a projection device according to another embodiment of the invention. Referring to FIG. 4, a projection device 10B of FIG. 4 is substantially the same as the projection device 10A of FIG. 1, and a main difference is shown as follows. In the embodiment, a light wavelength conversion wheel 112B of an illumination system 100B is a transmissive phosphor wheel and includes a phosphor region and a non-phosphor region. The non-phosphor region is, for example, a light penetration region. The phosphor region of the light wavelength conversion wheel 112B is provided with a reflective film layer to reflect a light beam. In addition, a light combining module 110B of the illumination system 100B further includes reflective elements 116A and 116B.

In the embodiment, the optical path switching element 114B is a wavelength beam splitter and is a beam splitter that reflects yellow light and be penetrating blue light. A first light beam B1 emitted by an excitation light source 111 first penetrates the optical path switching element 114B, and then penetrates a first lens group 113. At a first timing, the first light beam B1 penetrating the first lens group 113 is incident to a non-phosphor region of the light wavelength conversion wheel 112B along a first direction D1, and the light wavelength conversion wheel 112B receives the first light beam B1 and outputs, at the first timing, the first light beam B1'. The first light beam B1' penetrates the light wavelength conversion wheel 112B along a second direction D2 the same as the first direction D1. In addition, the first light beam B1' penetrating the light wavelength conversion wheel 112B is sequentially reflected by reflective elements 116B, 116A, and 116 to be transmitted to the optical path switching element 114B. Next, the first light beam B1' penetrates the optical path switching element 114B to be transmitted to a lens 115.

At a second timing of the embodiment, the first light beam B1 penetrating the first lens group 113 is incident to the phosphor region of the light wavelength conversion wheel 112B along the first direction D1, and the phosphor region of the light wavelength conversion wheel 112B converts the first light beam B1 into a second light beam B2 and outputs the second light beam B2. In addition, the second light beam B2 exits from the light wavelength conversion wheel 112B along a second direction D2'. The second direction D2' may be parallel to an optical axis 113A of the first lens group 113, and the second direction D2' is opposite to the first direction D1. What's more, the second light beam B2 penetrates the first lens group 113 and is then transmitted to the optical path switching element 114B. The second light beam B2 is then reflected by the optical path switching element 114B to be transmitted to the lens 115.

In the projection device 10B according to an embodiment of the invention, because the light wavelength conversion wheel 112B is a transmissive phosphor wheel, and the projection device 10B includes a plurality of reflective elements 116, 116A, and 116B, space utilization of optical elements in the projection device 10B is higher, so that a system volume of the projection device 10B may be further reduced.

Based on the foregoing, in the projection device according to an embodiment of the invention, due to the disposing manner of optical elements in the projection device, the first direction in the optical path, the second direction of the second light beam, the third direction, and the fourth direction are different from each other and are located on the same plane. Therefore, the depth of the system volume of the projection device may be effectively reduced, facilitating shorting of the projection distance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device comprising an illumination system, a light valve, and a projection lens, wherein the illumination system is configured to provide an illumination beam, the light valve is disposed on a transmission path of the illumination beam and is configured to convert the illumination beam into an image beam, and the projection lens is disposed on a transmission path of the image beam and is configured to project the image beam out of the projection device, wherein the illumination system comprises an excitation light source, a light wavelength conversion wheel, a color filter wheel, and a light homogenizing element, wherein
    the excitation light source is configured to emit a first light beam, the first light beam is incident to the light wavelength conversion wheel along a first direction, the light wavelength conversion wheel receives the first light beam to output the first light beam at a first timing and convert the first light beam into a second light beam and output the second light beam at a second timing, the second light beam exits from the light wavelength conversion wheel along a second direction, and the first light beam and the second light beam sequentially penetrate the color filter wheel and the light homogenizing element, so that the illumination system outputs the illumination beam, and the illumination beam comprises at least one of the first light beam and the second light beam,
    the illumination beam is incident to the light valve along a third direction and is converted into the image beam through the light valve, and the image beam exits from the light valve along a fourth direction, and
    the first direction, the second direction, the third direction, and the fourth direction are different from each other and are located on a same plane,
    wherein an optical surface of the light wavelength conversion wheel, an optical surface of the color filter wheel, and an effective imaging region of the light valve are not parallel to each other, and the optical surface of the light wavelength conversion wheel and the optical surface of the color filter wheel are not perpendicular to each other.

2. The projection device according to claim 1, wherein the optical surface of the light wavelength conversion wheel, the optical surface of the color filter wheel, and the effective imaging region of the light valve are perpendicular to the plane.

3. The projection device according to claim 1, further comprising:
    a first reflector disposed between the light wavelength conversion wheel and the color filter wheel on a transmission path of the first light beam and the second light beam, and configured to reflect the first light beam and the second light beam from the light wavelength conversion wheel to the color filter wheel.

4. The projection device according to claim 3, further comprising:
    a second reflector disposed between the light homogenizing element and the light valve on a transmission path of the illumination beam, and configured to reflect the illumination beam from the light homogenizing element to cause the illumination beam to be incident to the light valve along the third direction.

5. The projection device according to claim 4, wherein the first reflector or the second reflector is a plane mirror, a convex mirror, a concave mirror, or a prism.

6. The projection device according to claim 4, wherein the first reflector or the second reflector is a movable member.

7. The projection device according to claim 4, wherein the first reflector or the second reflector is a fixed member.

8. The projection device according to claim 4, wherein a reflective surface of the first reflector and a reflective surface of the second reflector are perpendicular to the plane.

9. The projection device according to claim 1, wherein an optical axis of the projection lens is parallel to the plane.

10. The projection device according to claim 1, wherein the projection lens has a movable axis perpendicular to the plane.

11. The projection device according to claim 1, wherein a long side of the effective imaging region of the light valve is perpendicular to the plane.

12. The projection device according to claim 1, wherein a projection of the illumination beam on the light valve is parallel to a short side of the effective imaging region of the light valve.

13. The projection device according to claim 1, wherein the light wavelength conversion wheel is a reflective phosphor wheel.

14. The projection device according to claim 1, wherein the light wavelength conversion wheel is a transmissive phosphor wheel.

* * * * *